United States Patent
Aoki

(10) Patent No.: US 10,404,177 B2
(45) Date of Patent: Sep. 3, 2019

(54) SWITCHING POWER SUPPLY CIRCUIT

(71) Applicant: Torex Semiconductor Ltd., Tokyo (JP)

(72) Inventor: Nobuhiro Aoki, Tokyo (JP)

(73) Assignee: Torex Semiconductor Ltd., Tokyo (JP)

( * ) Notice: Subject to any disclaimer, the term of this patent is extended or adjusted under 35 U.S.C. 154(b) by 0 days.

(21) Appl. No.: 16/039,668

(22) Filed: Jul. 19, 2018

(65) Prior Publication Data
US 2019/0028030 A1    Jan. 24, 2019

(30) Foreign Application Priority Data

Jul. 20, 2017 (JP) .................................. 2017-141002

(51) Int. Cl.
*H02M 3/158* (2006.01)
*H02M 3/157* (2006.01)

(52) U.S. Cl.
CPC .......... *H02M 3/1588* (2013.01); *H02M 3/157* (2013.01)

(58) Field of Classification Search
CPC ........................... H02M 3/1588; H02M 3/157
See application file for complete search history.

(56) References Cited

U.S. PATENT DOCUMENTS

| | | | |
|---|---|---|---|
| 5,481,178 A | 1/1996 | Wilcox et al. | |
| 7,135,844 B2 | 11/2006 | Hane et al. | |
| 8,456,143 B2 | 6/2013 | Nakashima | |
| 2008/0094861 A1 | 4/2008 | Wang | |
| 2010/0134084 A1* | 6/2010 | Miyamae | H02M 3/157 323/283 |
| 2013/0207627 A1* | 8/2013 | Kahn | G05F 1/46 323/271 |
| 2016/0141959 A1* | 5/2016 | Murakami | H02M 3/1588 323/271 |
| 2017/0163150 A1* | 6/2017 | Xi | H02M 3/157 |

FOREIGN PATENT DOCUMENTS

| | | |
|---|---|---|
| JP | 6303766 A | 10/1994 |
| JP | 2004328975 A | 11/2004 |
| JP | 2009148094 A | 7/2009 |

* cited by examiner

*Primary Examiner* — Jue Zhang
(74) *Attorney, Agent, or Firm* — The Webb Law Firm

(57) ABSTRACT

A switching power supply circuit preventing coil current reversal, while minimizing a current consumption and speeding up a switching frequency is provided. The switching power supply circuit under a synchronous rectification system compares a feedback voltage and a reference voltage by a comparator and, based on the results of the comparison, alternately turns on and off a main switching element and a subordinate switching element to convert a direct current input voltage into a direct current output voltage. The circuit includes: an on-time generation circuit which, based on the input voltage and the output voltage, defines the on-times of the main switching element and the subordinate switching element; and a switching signal generation unit which, based on the output signals of the comparator and the on-time generation circuit, generates switching signals for controlling the on/off operation of the main switching element and the subordinate switching element.

2 Claims, 5 Drawing Sheets

SWITCHING POWER SUPPLY CIRCUIT

CROSS-REFERENCE TO RELATED APPLICATION

This application claims priority to Japanese Patent Application No. 2017-141002 filed Jul. 20, 2017, the disclosure of which is hereby incorporated in its entirety by reference.

TECHNICAL FIELD

This invention relates to a switching power supply circuit and, more specifically, to that useful when applied as a switching power supply circuit under a synchronous rectification system by COT control.

BACKGROUND ART

As a switching power supply circuit for generating a predetermined direct current output voltage from a direct current input voltage, a DC/DC converter using a synchronous rectification system is known. This type of DC/DC converter compares a feedback voltage, which is based on a direct current output voltage supplied as feedback from the output side, with a predetermined reference voltage and, based on the results of the comparison, alternately turns on/off a main switching element (switching element on the power supply side) and a subordinate switching element (switching element on the ground side) to convert a direct current input voltage into the predetermined direct current output voltage.

With the DC/DC converter of the above-mentioned type, there may arise a so-called backflow phenomenon, a phenomenon in which an output current to be supplied normally to a load flows into the subordinate switching element side via a coil. Such a backflow phenomenon is apt to occur particularly under a light load, and has to be prevented from happening, because it presents a cause of a reduction in the efficiency of the DC/DC converter. In a DC/DC converter according to a conventional technology, therefore, a circuit for preventing coil current reversal during synchronous rectification is provided, see Japanese Patent Document JP-A-2004-328975.

The circuit for prevention of coil current reversal during synchronous rectification according to the conventional technology compares the current flowing in the coil with a finite current value or 0 mA for preventing reversal to turn off the subordinate switching element for synchronous rectification, thereby preventing the polarity of the coil current from inverting. The circuit also adopts a so-called zero comparator system which monitors the change of a terminal voltage $V_{LX}$ on the subordinate switching element side of the coil from a negative voltage to a positive voltage and, immediately after reversal of the coil current, turns off the subordinate switching element for synchronous rectification.

Preventing the reversal of the coil current under any conditions, however, has required an extensive circuit scale and, at the same time, has driven a high speed comparator, thus increasing current consumption. These facts have constituted factors impeding the speed increase of the switching frequency in recent years.

The present invention has been accomplished in the light of the above-mentioned earlier technologies. It is an object of the invention to provide a switching power supply circuit which can achieve the prevention of coil current reversal, while minimizing current consumption and speeding up the switching frequency, without requiring a quick response.

SUMMARY OF THE INVENTION

A first aspect of the present invention for attaining the above object is a switching power supply circuit under a synchronous rectification system, which alternately turns on and off a main switching element and a subordinate switching element based on a feedback voltage grounded on a direct current output voltage supplied as feedback from an output side, and based on a predetermined reference voltage, to convert a direct current input voltage into the output voltage, comprising:

circuit means which compares the feedback voltage and the reference voltage and, at a point in time where the feedback voltage falls short of the reference voltage, generates a first one-shot pulse signal for turning on the main switching element via a switching signal generation unit; and an on-time generation circuit which, based on the input voltage and the output voltage, generates a second one-shot pulse signal for turning off the main switching element and simultaneously turning on the subordinate switching element, via the switching signal generation unit, and also generates a third one-shot pulse signal for turning off the subordinate switching element via the switching signal generation unit;

wherein the on-time generation circuit includes a first comparator which has a non-inverting input terminal supplied with a ramp voltage generated based on the input voltage and changing with a predetermined gradient, which has an inverting input terminal supplied with a predetermined divided output voltage obtained by resistor-dividing the output voltage, and which, based on results of comparison between the ramp voltage and the divided output voltage, sends out the second one-shot pulse signal defining an on-time of the main switching element, and a second comparator which has a non-inverting input terminal supplied with the ramp voltage, which has an inverting input terminal supplied with a predetermined divided input voltage obtained by resistor-dividing the input voltage, and which, based on results of comparison between the ramp voltage and the divided input voltage, sends out the third one-shot pulse signal defining an on-time of the subordinate switching element.

A second aspect of the present invention is the switching power supply circuit according to the first aspect, wherein the inverting input terminal of the second comparator of the on-time generation circuit is supplied with the divided input voltage generated by supplying a subordinate switching element current, which is a current flowing in the subordinate switching element, to a node of resistors for resistor-dividing the input voltage.

Effects of the Invention

According to the present invention, the on-time of the subordinate switching element during which the subordinate switching element keeps ON is controlled in view of the input voltage, the output voltage, and the current flowing through the subordinate switching element for synchronous rectification. Thus, a minimal current consumption and a high switching frequency can be achieved, without the need for a quick response. Furthermore, a part of the circuit provided for COT (Constant on Time) control for controlling the on-time of the main switching element during which the main switching element keeps ON can be concurrently used for the above purpose. Hence, the area of the switching power supply circuit (IC chip) can be narrowed.

DETAILED DESCRIPTION AND BEST MODE FOR CARRYING OUT THE INVENTION

The embodiment of the present invention will now be described in detail with reference to the accompanying drawings.

Figure 1:
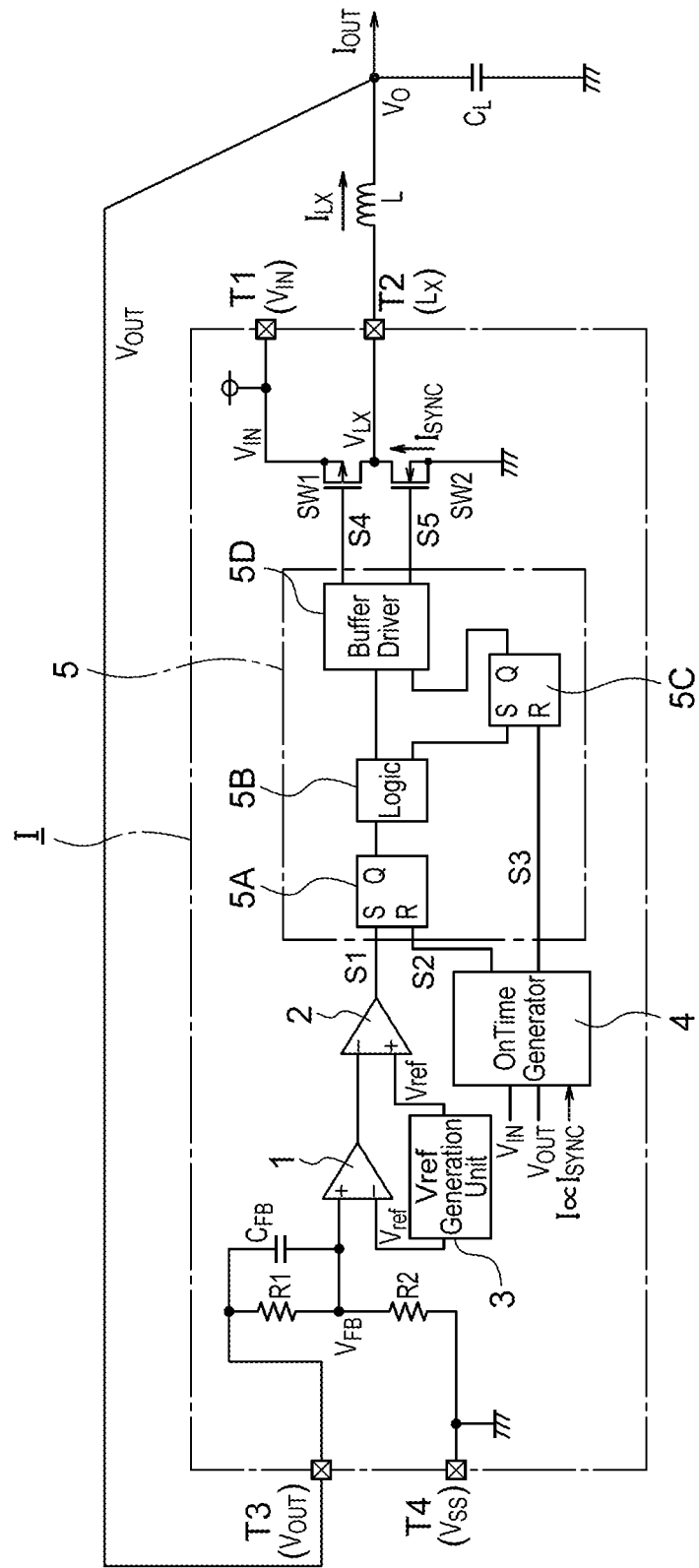
FIG. 1 is a block diagram showing a switching power supply circuit according to an embodiment of the present invention.

FIG. 1 is a block diagram showing a switching power supply circuit according to the embodiment of the present invention. As shown in this drawing, the switching power supply circuit according to the present embodiment is a step-down synchronous rectification DC/DC converter. However, the switching power supply circuit is not limited to the present embodiment, but is satisfactorily applicable to a step-up regulator as well as an inverting regulator. The switching power supply circuit according to the present embodiment, moreover, adopts a COT (Constant on Time) control system, proposed as a control system for a feedback circuit for stabilizing the output voltage, in the DC/DC converter.

As shown in FIG. 1, an output voltage $V_{OUT}$ is inputted to a non-inverting input terminal of an error amplification circuit 1, as a feedback voltage $V_{FB}$ obtained by dividing the output voltage $V_{OUT}$ by resistors R1, R2. An inverting input terminal of the error amplification circuit 1 receives, as input, a reference voltage $V_{ref}$ which has been generated by a reference voltage generation unit 3 and set thereby beforehand. Thus, the error amplification circuit 1 compares the reference voltage $V_{ref}$ with the feedback voltage $V_{FB}$, amplifies an error which is the difference between these voltages, and outputs the amplified error as an error voltage $V_{err}$. A capacitor $C_{FB}$ in the drawing is a capacitor for phase compensation.

A comparator 2 compares the reference voltage $V_{ref}$ with the error voltage $V_{err}$, and outputs a one-shot pulse signal S1 which rises at a point in time where the error voltage $V_{err}$ falls short of the reference voltage $V_{ref}$.

In the present embodiment, the resistors R1, R2, the error amplification circuit 1, the comparator 2, and the reference voltage generation unit 3 constitute a circuit means which compares the feedback voltage $V_{FB}$ with the reference voltage $V_{ref}$ and generates the first one-shot pulse signal S1 at a point in time where the feedback voltage $V_{FB}$ falls short of the reference voltage $V_{ref}$. The one-shot pulse signal S1 turns on a main switching element SW1 via a switching signal generation unit 5.

An on-time generation circuit 4 generates, based on an input voltage $V_{IN}$ and the output voltage $V_{OUT}$ a second one-shot pulse signal S2 for turning off the main switching element SW1 and simultaneously turning on a subordinate switching element SW2 via the switching signal generation unit 5, and generates a third one-shot pulse signal S3 for turning off the subordinate switching element SW2 via the switching signal generation unit 5. In this manner, the on-times of the main switching element SW1 and the subordinate switching element SW2 are defined by the one-shot pulse signals S1, S2, S3, the output signals of the on-time generation circuit 4. In further detail, the switching signal generation unit 5 generates switching signals S4, S5 for controlling the on/off operation of the main switching element SW1 and the subordinate switching element SW2 based on the one-shot pulse signal S1 which is the output signal of the comparator 2, and the one-shot pulse signals S2, S3 which are the output signals of the on-time generation circuit 4. Under the action of such switching signals S4, S5, the main switching element SW1 and the subordinate switching element SW2 are turned on or off to convert a predetermined direct current input voltage $V_{IN}$ into a predetermined direct current output voltage $V_{OUT}$ by synchronous rectification.

The input voltage $V_{IN}$ is supplied from an external direct current power source (not shown) to a terminal T1. To a node $V_{LX}$ between the main switching element SW1 and the subordinate switching element SW2 connected in series, the one-end side of a coil L is connected via a terminal T2. The other-end side of the coil L serves as an output terminal $V_o$. An output current $I_{OUT}$ based on a coil current $I_{LX}$ flowing through the coil L is supplied to an external load (not shown) via the output terminal $V_o$ to which a smoothing capacitor $C_L$ is connected. The output terminal $V_o$ is also connected to a terminal T3, and supplies the output voltage $V_{OUT}$, as feedback, to the input side via the terminal T3 to generate the feedback voltage $V_{FB}$.

The switching signal generation unit 5 in the present embodiment has a latch circuit 5A, a logic circuit 5B, a latch circuit 5C, and a buffer driver 5D. The latch circuit 5A is set by the one-shot pulse signal S1, and reset by the one-shot pulse signal S2. The latch circuit 5C is set by a Q output of the latch circuit 5A via the logic circuit 5B, and reset by the one-shot pulse signal S3. The Q output of the latch circuit 5A mediated by the logic circuit 5C, and a Q output of the latch circuit 5C turn into the switching signals S4, S5 via the buffer driver 5D to perform on/off control of the main switching element SW1 and the subordinate switching element SW2.

The above-described parts, other than the direct current power source (not shown), the coil L and the smoothing capacitor $C_L$, are packed in an IC chip integrated with the terminals T1, T2, T3, T4. The terminal T4 is a GND terminal.

Figure 2:
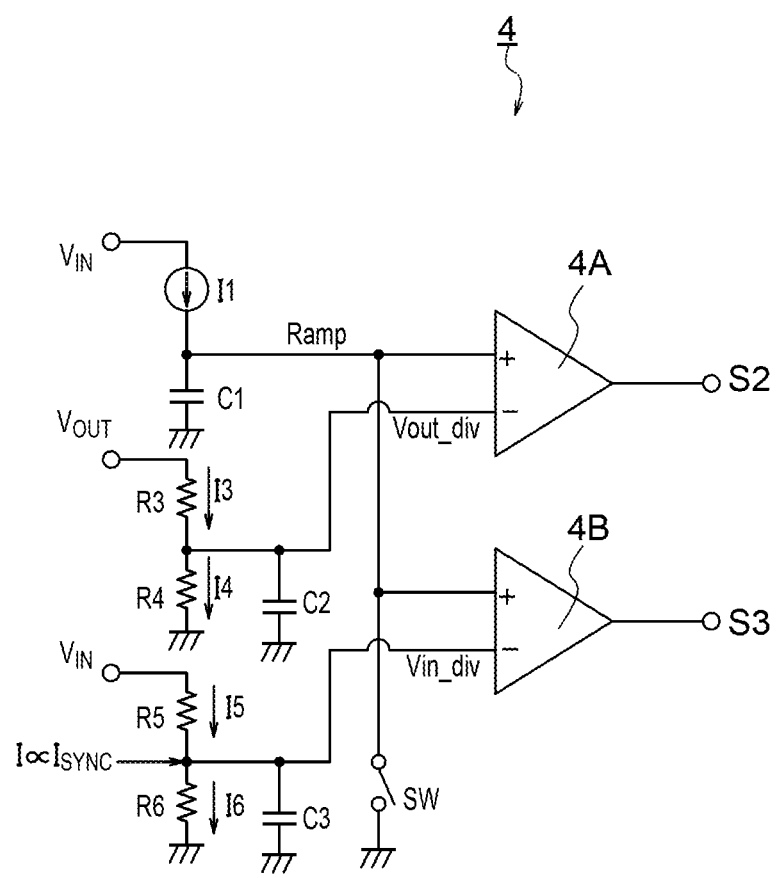
FIG. 2 is a circuit diagram showing the detailed configuration of an on-time generation unit shown in FIG. 1.

FIG. 2 is a circuit diagram showing the detailed configuration of the on-time generation circuit 4 extracted from FIG. 1. As shown in FIG. 2, a first comparator 4A has a non-inverting input terminal supplied with a ramp voltage $R_{amp}$ generated based on the input voltage $V_{IN}$ and varying with a predetermined gradient, and has an inverting input terminal supplied with a predetermined divided output voltage $V_{out\_div}$ obtained by resistor-dividing the output voltage $V_{OUT}$ by resistors R3, R4. Based on the results of comparison between the ramp voltage $R_{amp}$ and the divided output voltage $V_{out\_iv}$, the first comparator 4A outputs the one-shot pulse signal S2, the output signal for defining the on-time of the main switching element SW1.

The ramp voltage $R_{amp}$ is obtained by charging a capacitor C1 with a constant current I1 generated based on the input voltage $V_{IN}$, whereas the divided output voltage $V_{out\_div}$ is obtained as a charge voltage charged into a capacitor C2 connected between the resistors R3 and R4 based on currents I3, I4 flowing through the resistors R3, R4.

A second comparator 4B has a non-inverting input terminal supplied with the ramp voltage $R_{amp}$, and has an inverting input terminal supplied with a predetermined divided input voltage $V_{in\_div}$ obtained by resistor-dividing the input voltage $V_{IN}$ by resistors R5, R6. Based on the results of comparison between the ramp voltage $R_{amp}$ and the divided input voltage $V_{in\_div}$, the second comparator 4B generates the one-shot pulse signal S3, the output signal for defining the on-time of the subordinate switching element SW2.

The divided input voltage $V_{in\_div}$ is obtained as a charge voltage charged into a capacitor C3 connected between the resistors R5 and R6 based on currents I5, I6 flowing through the resistors R5, R6.

In the present embodiment, the divided input voltage $V_{in\_div}$ is generated using a voltage which has been generated by injecting a current based on a subordinate switching element current $I_{SYNC}$ into the node of the resistors R5, R6 resistor-dividing the input voltage $V_{IN}$. The subordinate switching element current $I_{SYNC}$ refers to a current flowing through the switching element SW2 (see FIG. 1), and the current based thereon refers, in the present embodiment, to a proportional current I proportional to the subordinate switching element current $I_{SYNC}$ (i.e., $I = \alpha I_{SYNC}$).

It is not indispensable to inject the proportional current I proportional to the subordinate switching element current $I_{SYNC}$ in generating the divided input voltage $V_{in\_div}$, as described above. By injecting the proportional current I, however, it becomes possible to adjust the timing at which the subordinate switching element SW2 is turned off, thereby achieving optimization. In this connection, a detailed description will be offered later based on FIG. 5 (a) to 5 (h).

Figure 3:
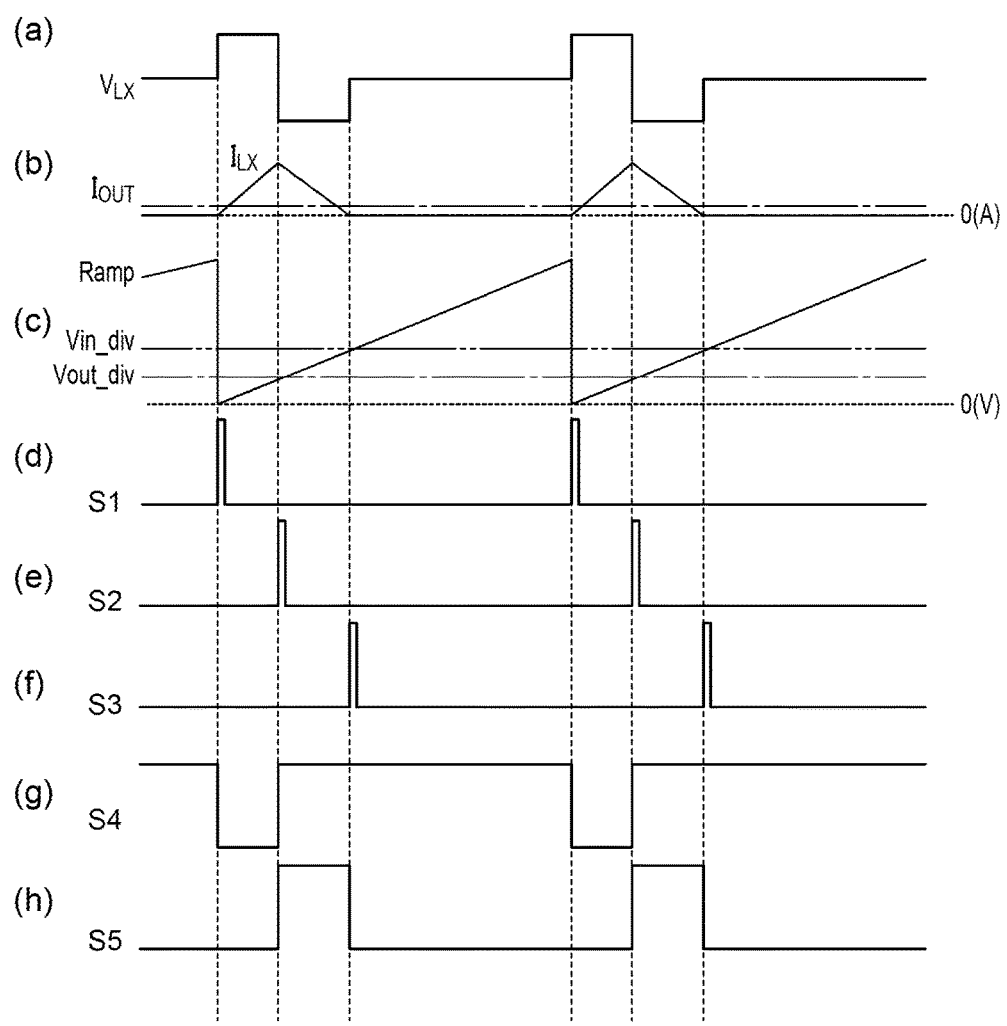
FIGS. 3 (a) to 3 (h) are timing charts showing the operation timings of respective parts under a light load on the switching power supply circuit shown in FIG. 1.
Figure 4:
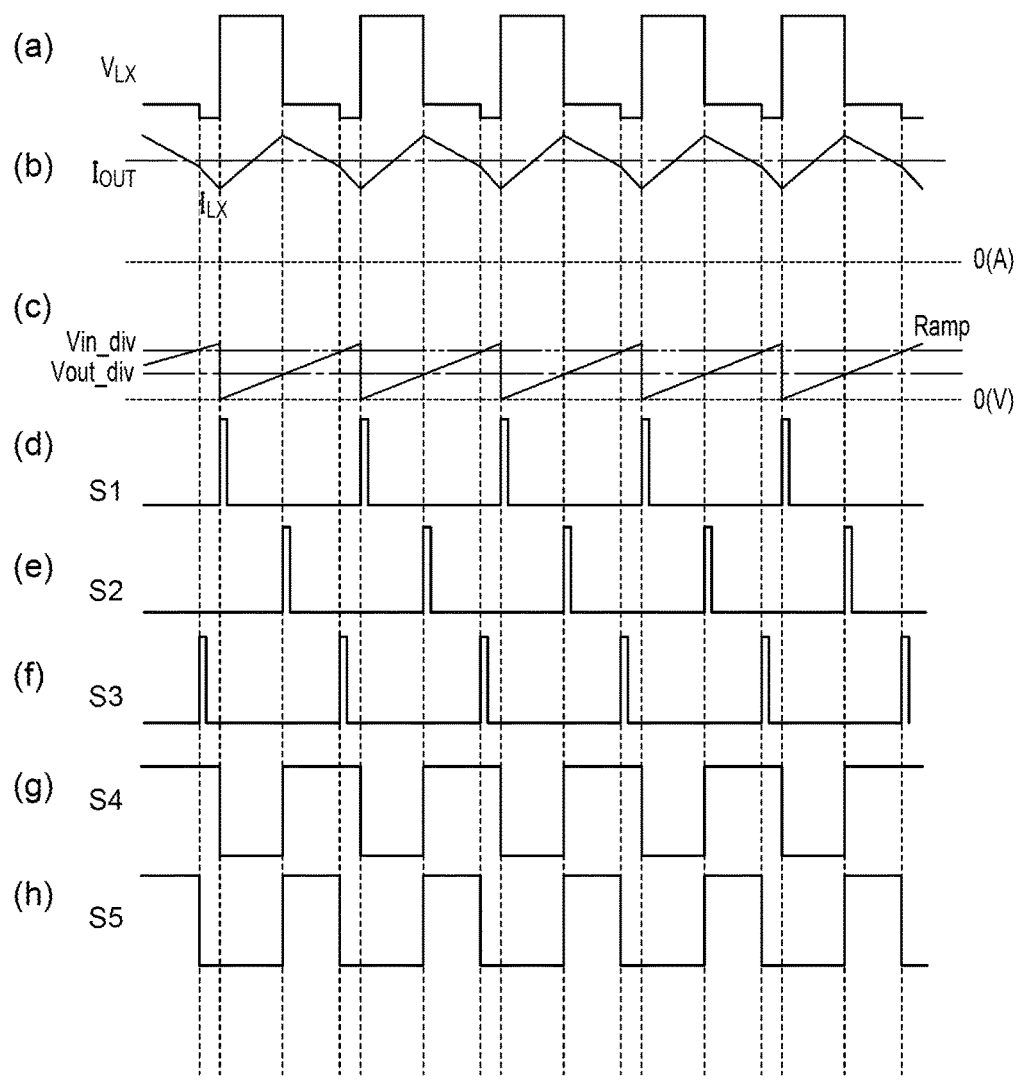
FIG. 4 (a) to 4 (h) are timing charts showing the operation timings of the respective parts under a heavy load on the switching power supply circuit shown in FIG. 1.
Figure 5:
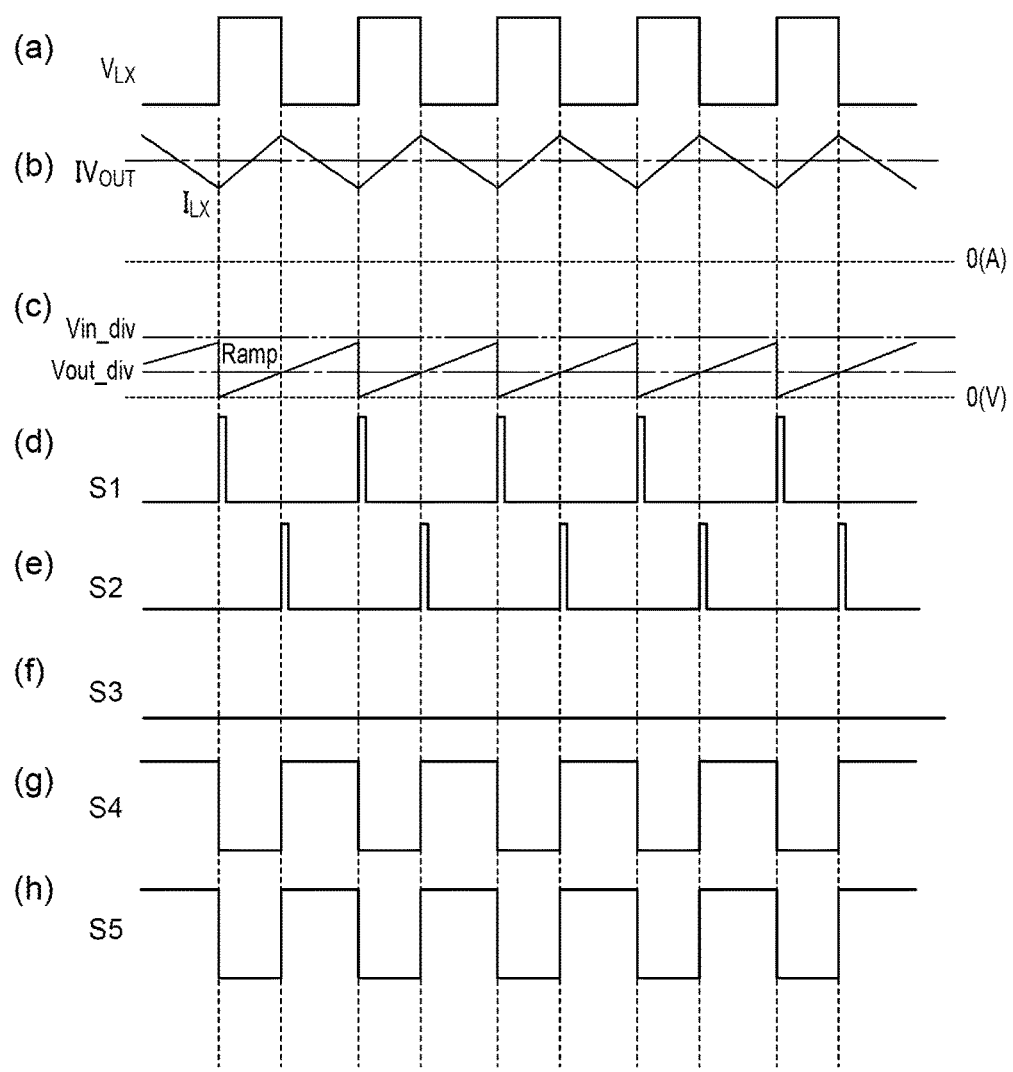
FIG. 5 (a) to 5 (h) are timing charts showing the operation timings of the respective parts under the heavy load on the switching power supply circuit shown in FIG. 1.

FIG. 3 (a) to 3 (h) to FIG. 5 (a) to 5 (h) are timing charts showing the operation timings of the respective parts of the switching power supply circuit shown in FIG. 1. FIG. 3 (a) to 3 (h) show the operation timings under a light load, while FIG. 4 (a) to 4 (h) and FIG. 5 (a) to 5 (h) show the operation timings under a heavy load. Based on these drawings, the actions of the switching power supply circuit according to the present embodiment will be explained.

<Under Light Load>

FIG. 3 (b) shows a case where the output current $I_{OUT}$ is small. In this case, the internal reference voltage $V_{ref}$ and the feedback voltage $V_{FB}$, which has been obtained by resistor-dividing the output voltage $V_{out}$, are compared in the error amplification circuit 1, and the difference between them is inputted to the comparator 2. At the time of the difference exceeding a predetermined value, the one-shot pulse signal S1, which is the output signal of the comparator 2, is generated (see FIG. 3 (d)) to start the on-operation of the main switching element SW1.

Simultaneously, the intermediate potential ($R_{amp}$) between the current I1 and the capacitor C1 shown in FIG. 2 is discharged by closing a switch SW to turn it into a ground potential, and the ramp voltage $R_{amp}$ starts to be charged (see FIG. 3 (c)). The switch SW is turned on by the one-shot pulse signal S1 rising at the time when the error voltage $V_{err}$ falls short of the reference voltage $V_{ref}$, thereby discharging the charge of the capacitor C1.

In the present embodiment, assuming that the time when the main switching element SW1 starts to be turned on is 0, the ramp voltage $R_{amp}$ at an arbitrary time t is represented by Equation (1).

Ramp voltage $R_{amp} = I1 \times t / C1$ (1)

If the divided output voltage $V_{out\_div}$ obtained by resistor-dividing the output voltage $V_{OUT}$ by the resistors R3, R4, and the ramp voltage $R_{amp}$ are equal to each other, as shown in FIG. 3 (c), the output of the comparator 4A is inverted to send out the one-shot pulse signal S2. As a result, the on-state of the main switching element SW1 is finished, while the on-state of the subordinate switching element SW2 is started (see FIGS. 3 (g), 3 (h)). Assuming that the on-time of the main switching element SW1 is $_tP_{ch}ON$, Equation (2) holds. The term "$P_{ch}ON$" refers to the on-state of the switching element SW1 which is a Pch MOS transistor (the same applies hereinafter).

$I1 \times _tP_{ch}ON / C1 = V_{OUT} \times R4/(R3+R4)$ (2)

As shown in FIG. 2, on the other hand, if the divided input voltage $V_{in\_div}$ obtained by resistor-dividing the input voltage $V_{IN}$ by the resistors R5, R6, and the ramp voltage $R_{amp}$ are equal to each other, the output of the second comparator 4B is inverted to H, whereupon the one-shot pulse signal S3 is outputted. As a result, the on-state of the subordinate switching element SW2 ends. Assuming, here, that the on-time of the subordinate switching element SW2 is $_tN_{ch}ON$, Equation (3) holds. The term "$N_{ch}ON$" refers to the on-state of the switching element SW2 which is an Nch MOS transistor (the same applies hereinafter).

$I1 \times _tN_{ch}ON / C1 = V_{IN} \times R6/(R5+R6) - V_{OUT} \times R4/(R3+R4)$ (3)

If Equations (2) and (3) are expanded, with R3=R5 and R4=R6, the following equation is given:

$V_{OUT}/(V_{IN} - V_{OUT}) = _tP_{ch}ON / _tN_{ch}ON$ (4)

Assuming that the inductance value of the coil L is L, and the change amount of the coil current $I_{LX}$ during the on-period of the main switching element SW1 (Pch) is $\Delta I_{LX}$, the relation among the on-time $_tP_{ch}ON$ of the main switching element SW1, the inductance L, and the change amount $\Delta I_{LX1}$ is represented by Equation (5).

$V_{IN} - V_{OUT} = L \times \Delta I_{LX1} / _tP_{ch}ON$ (5)

Similarly, assuming that the change amount of the coil current $I_{LX}$ during the on-period of the subordinate switching element SW2 (Nch) is $\Delta I_{LX2}$, the relation among the on-time $_tN_{ch}ON$ of the subordinate switching element SW2, the inductance L, and the change amount $\Delta I_{LX2}$ is represented by Equation (6).

$V_{OUT} = L \times \Delta I_{LX2} / _tN_{ch}ON$ (6)

If the output current $I_{OUT}$ is small under a light load, the maximum value of the coil current $I_{LX}$ is $\Delta I_{LX1}$. $\Delta I_{LX2}$ at which the polarity of the coil current $I_{LX}$ is inverted equals $\Delta I_{LX1}$. Expansion of Equations (5) and (6), with $\Delta I_{LX1} = \Delta I_{LX2}$, gives Equation (7).

$V_{OUT}/(V_{IN} - V_{OUT}) = _tP_{ch}ON / _tN_{ch}ON$ (7)

Provided that R3=R5 and R4=R6, Equation (4) and Equation (7) are equal. Thus, the subordinate switching element SW2 can be turned off at a timing when the polarity of the coil current $I_{LX}$ is inverted.

Actually, the timing for turning off the subordinate switching element SW2 deviates owing to variations in the resistance values of the resistors R3, R4, R5, R6, or variations in the response speeds, gains, or input offset voltages of the first and second comparators 4A and 4B. If a highly accurate timing is required, therefore, it is necessary to provide the resistors R3, R4, first comparator 4A, and the resistors R5, R6, second comparator 4B with the same circuit and the same layout.

In order to reliably avoid a situation where the coil current $I_{LX}$ is reversed, moreover, there is need to set an earlier timing for turning off the subordinate switching element SW2 in anticipation of a timing deviation. Advancement of the timing for turning off the subordinate switching element SW2 can be achieved by providing differences among the resistance values of the resistors R3, R4, R5 and R6, or differences between the response speeds, gains and input offset voltages of the first comparator 4A and those of the second comparator 4B. It is also possible to use a resistor instead of the constant current source for the current I1, although the resulting accuracy is somewhat poorer.

<Under Heavy Load>

FIG. 4 (b) shows a case where the output current $I_{OUT}$ is large. In this case as well, the internal reference voltage $V_{ref}$ and the feedback voltage $V_{FB}$, which has been obtained by resistor-dividing the output voltage $V_{out}$, are compared in the error amplification circuit 1, and the difference between them is inputted to the comparator 2. At the time of the difference exceeding a predetermined value, the one-shot pulse signal S1, which is the output signal of the comparator 2, is generated (see FIG. 4 (d)) to start the on-operation of the main switching element SW1. That is, the switching control itself is performed in the same manner as that shown in FIG. 3 (a) to 3 (h), and the one-time of the main switching element SW1 is determined by Equations (1), (2), as under the light load shown in FIG. 3 (a) to 3 (h). If, in this case, the timing for turning off the subordinate switching element SW2 is set to be earlier in anticipation of a timing deviation in order to reliably prevent the coil current $I_{LX}$ from reversing, the subordinate switching element SW2 is turned off, as shown in FIG. 4 (h), thereby resulting in a decreased efficiency.

Such a decrease in the efficiency can be avoided by injecting the proportional current I ($^\propto I_{SYNC}$) proportional to the subordinate switching element current $I_{SYNC}$ flowing through the subordinate switching element SW2 into the node of the resistors R5, R6 to raise the divided input voltage $V_{in\_div}$, thereby preventing the subordinate switching element SW2 from being turned off.

In further detail, assuming that the current flowing in the resistor R5 is I5 and the current flowing in the resistor R6 is I6, Equations (8) and (9) hold.

$$I6 = I5 + I^\propto I_{SYNC} \quad (8)$$

$$VIN = I5 \times R5 + I6 \times R6 \quad (9)$$

By expanding Equations (8) and (9), Equations (10) and (11) are obtained.

$$I5 = (V_{IN} - I^\propto I_{SYNC} \times R6)/(R5 + R6) \quad (10)$$

$$I6 = (V_{IN} - I^\propto I_{SYNC} \times R5)/(R5 + R6) \quad (11)$$

The divided input voltage $V_{in\_div}$ is given by Equation (12).

$$V_{in\_div} \text{ voltage} = I6 \times R6 \quad (12)$$

Expansion of Equations (11) and (12) gives the following equation:

$$V_{in\_div} = V_{IN} \times R6/(R5+R6) + I^\propto I_{SYNC} \times R5 \times R6/(R5+R6) \quad (13)$$

By adjusting $I^\propto I_{SYNC}$, therefore, the timing for turning off the subordinate switching element SW2 can be adjusted to realize optimization.

By adjusting the proportional current I ($^\propto I_{SYNC}$), as mentioned above, timing charts as shown in FIG. 5 (a) to 5 (h) can be obtained after the adjustment. In this case, the one-shot pulse signal S1 is inverted to H before the ramp voltage $R_{amp}$ reaches the divided input voltage $V_{in\_div}$, as shown in FIG. 5 (d), whereby the switch SW is thrown to discharge the ramp voltage $R_{amp}$. As a result, the one-shot pulse signal S3 is not inverted to H, but fixed at L, as shown in FIG. 5 (f). As shown in FIGS. 5 (g) and 5 (h), therefore, the period during which the switching elements SW1 and SW2 under on/off control by the switching signals S4, S5 are both brought to OFF is eliminated, and the on/off actions of both switching elements SW1 and SW2 can be synchronized completely. Consequently, the efficiency of the switching power supply circuit under the heavy load can be optimized to achieve the highest efficiency.

The invention claimed is:

1. A switching power supply circuit under a synchronous rectification system, which alternately turns on and off a main switching element and a subordinate switching element based on a feedback voltage grounded on a direct current output voltage supplied as feedback from an output side, and based on a predetermined reference voltage, to convert a direct current input voltage into the output voltage, comprising:

circuit means which compares the feedback voltage and the reference voltage and, at a point in time where the feedback voltage falls short of the reference voltage, generates a first one-shot pulse signal for turning on the main switching element via a switching signal generation unit; and an on-time generation circuit which, based on the input voltage and the output voltage, generates a second one-shot pulse signal for turning off the main switching element and simultaneously turning on the subordinate switching element, via the switching signal generation unit, and also generates a third one-shot pulse signal for turning off the subordinate switching element via the switching signal generation unit;

wherein the on-time generation circuit includes a first comparator which has a non-inverting input terminal supplied with a ramp voltage generated based on the input voltage and changing with a predetermined gradient, which has an inverting input terminal supplied with a predetermined divided output voltage obtained by resistor-dividing the output voltage, and which, based on results of comparison between the ramp voltage and the divided output voltage, sends out the second one-shot pulse signal defining an on-time of the main switching element, and a second comparator which has a non-inverting input terminal supplied with the ramp voltage, which has an inverting input terminal supplied with a predetermined divided input voltage obtained by resistor-dividing the input voltage, and which, based on results of comparison between the ramp voltage and the divided input voltage, sends out the third one-shot pulse signal defining an on-time of the subordinate switching element.

2. The switching power supply circuit according to claim 1, wherein the inverting input terminal of the second comparator of the on-time generation circuit is supplied with the divided input voltage generated by supplying a subordinate switching element current, which is a current flowing in the subordinate switching element, to a node of resistors for resistor-dividing the input voltage.

* * * * *